UNITED STATES PATENT OFFICE.

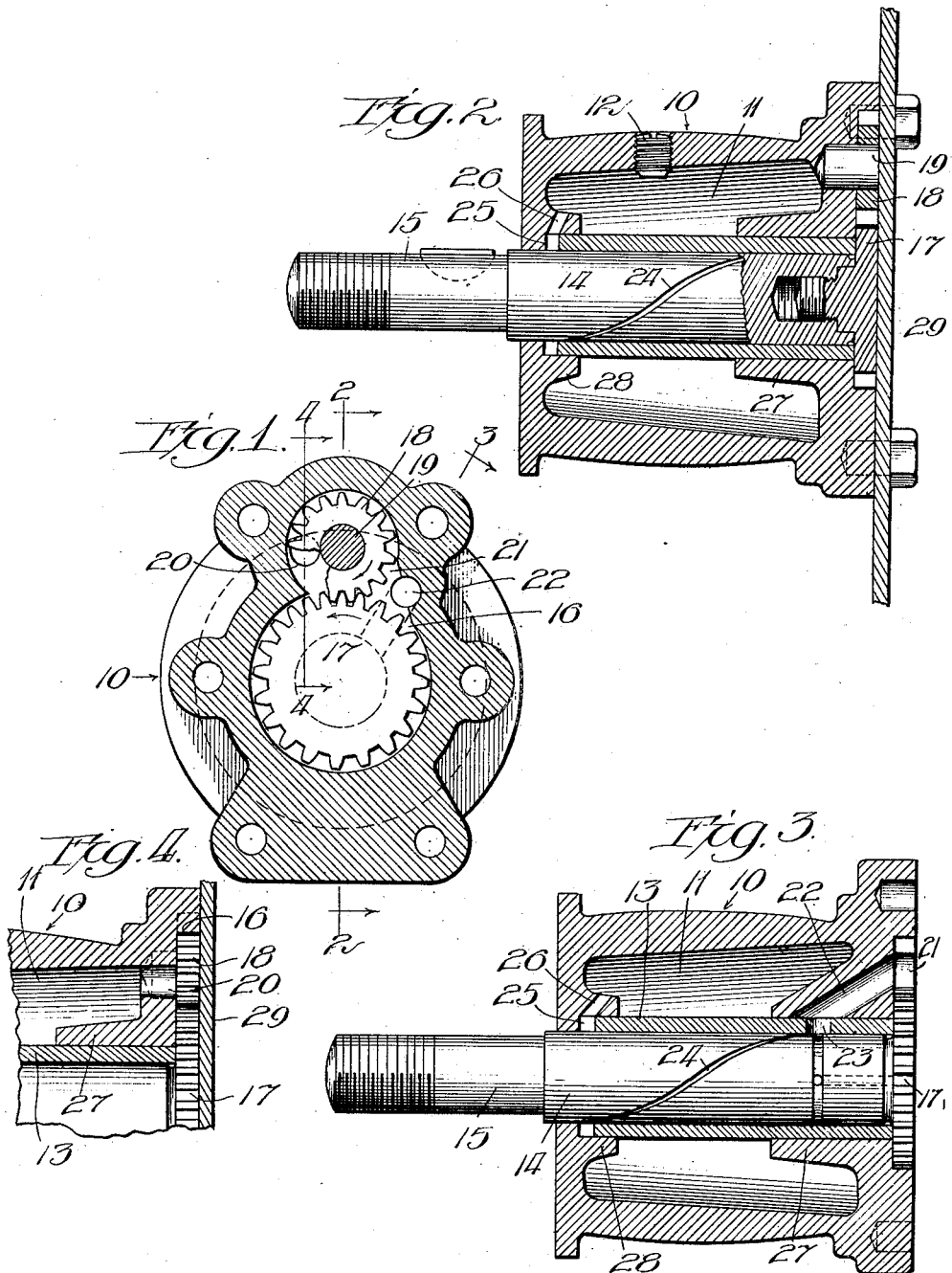

TRUMAN B. FUNK, OF MOLINE AND CLARENCE M. EASON, OF CHICAGO, ILLINOIS.

PRESSURE-LUBRICATED BEARING.

1,370,422.          Specification of Letters Patent.        Patented Mar. 1, 1921.

Application filed January 12, 1920. Serial No. 350,739.

*To all whom it may concern:*

Be it known that we, TRUMAN B. FUNK and CLARENCE M. EASON, both citizens of the United States, the former residing at Moline, in the county of Rock Island and State of Illinois, and the latter residing at Chicago, in the county of Cook and State of Illinois, have invented certain new and useful Improvements in Pressure-Lubricated Bearings, of which the following is a specification.

The present invention is intended primarily as a bearing for an automobile fan, although it is obvious that it might be otherwise employed; and the object of the invention is to obviate the necessity for the use of balls, rollers, or other costly and complicated bearing devices, and to provide simple and effective means for circulating a lubricant under pressure through all portions of the bearing, so that a continuous film of oil will be maintained between the metal surfaces and perfect lubrication afforded. With this end in view, the invention consists in the provision of suitable pressure pumping devices of simple construction which are carried with and operated by the action of the rotating parts of the bearing, which devices are self-contained within the bearing and can be utilized without complicating the structure in any material degree.

The invention consists in the features of construction and combination of parts hereinafter described and claimed.

In the drawings:

Figure 1 is a cross sectional elevation of the bearing of the present invention taken through the gear pump;
Fig. 2 is a longitudinal sectional elevation taken on line 2—2 of Fig. 1;

Fig. 3 is a longitudinal sectional elevation taken on line 3—3 of Fig. 1; and

Fig. 4 is a fragment of a sectional elevation taken on line 4—4 of Fig. 1.

The bearing as a whole comprises a housing 10 of generally cylindrical shape, which preferably constitutes the hub of a fan or other rotating device, and is in form to constitute a pulley for the reception of a driving belt. The housing is provided on its interior with a tapered annular chamber 11, which furnishes a reservoir for a lubricant which is admitted into the chamber through a port in the side which is closed by means of a screw plug 12. The inner wall of the chamber 11 is preferably afforded by a tubular bearing sleeve 13, which, however, may be integrally formed with the remainder of the casing, and which affords a mounting for a fixed stub shaft 14 having a projection 15 extending beyond the bearing and adapted to be entered into a suitable portion of the engine casing or other suitable surface.

The outer end face of the casing is provided with a recess 16 of substantially the configuration of the numeral 8, which affords a mounting for a thrust disk in the form of an inner pinion 17 mounted on or threaded into the end of the stub shaft 14, and an outer pinion 18 mounted on a pintle 19, the two gears meshing together and furnishing in conjunction with the surrounding walls of the casing a gear pump adapted to force lubricant admitted from the reservoir 11 into the space intermediate the tubular sleeve 13 and the fixed shaft around which the remaining portions rotate.

The lubricant is admitted to the outer pump pinion through a port 20 formed in the recessed portion of the end wall of the housing at the point of greatest diameter of the chamber 11, which port admits the lubricant close to the periphery of the outer pump pinion and in position to flow between the teeth of the pinion and be carried around therewith in the direction of the arrow until it reaches an enlargement 21 in the chamber, which enlargement communicates with an inwardly extending obliquely disposed passageway 22, which in turn communicates with a port 23 formed in the adjacent wall of the tubular sleeve 13. The oil at this point will be forced between the bearing surfaces, and in order to facilitate the inflow and distribution of oil the stub shaft is provided in its surface with one or more grooves 24 of spiral or other formation which receive the admitted oil and distribute it from end to end of the shaft. In order to provide for the return of the oil thus distributed, an annular chamber 25 is provided at the end of the tubular sleeve 13, which channel communicates with the oil reservoir through a passage 26. If desired, a groove 26ª may be formed near the end of the stub shaft in communication with the port 23 and leading to an interior bore 26ᵇ, through which oil is distributed to the front end of the thrust disk 17.

The formation of the shell or casing is such as to provide inwardly extending bosses 27 and 28 at opposite ends of the casing, which bosses are cored to afford mountings for the tubular sleeve, and also to afford the necessary body of metal for the formation of the passages 22 and 26. The casing as a whole has secured thereto a fan 29, or other device, which affords a closure for the recess 16, and since the fan lies in facial contact with the pump pinions it is evident that the oil or other lubricant admitted to the gear pump must flow around the annular channel afforded between the gear teeth and the adjacent wall surfaces.

The operation of the device is as follows: The reservoir 11 is filled with oil or lubricant, and when rotation is imparted to the casing by means of a belt or the like the oil will be thrown outward by centrifugal action to the outer walls of the reservoir 11, and at the same time the outer pinion of the gear pump will be subjected to rotation on its pintle concurrently with its revolution around the inner pinion. The gear teeth, at the point where they intermesh with one another, will block off the further passage of oil between the teeth and force the oil through the obliquely disposed passageway 22 and into the bearing surfaces, at which point the oil will be forced under pressure between the bearing surfaces and its endwise distribution facilitated by the flow of oil through the spirally formed passageway 24.

It is obvious that so long as rotation is imparted to the fan the distribution of oil under pressure will continue and perfect lubrication will be afforded without the provision of ball bearings, roller bearings, or similar complications which require careful adjustment and greatly increase the initial expense and require careful lubrication in order to be maintained in operative condition. The present invention is one in which the cost of machining and assembling is reduced to a minimum and in which all of the wearing surfaces, including those comprising the pump itself, are constantly subjected to lubrication, so that the wearing life of the parts is prolonged almost indefinitely. At the same time the pulley itself provides a casing for the oil reservoir in which a sufficient supply of oil can be maintained for a long period of time.

Although the invention has been described as one in which the stub shaft is defined as the stationary element, nevertheless it is obvious that the relative rotation of the parts might be reversed without modification in structure or function, save for the fact that centrifugal action could not be relied upon to throw the oil to the periphery of the reservoir chamber, so that it would be necessary in these circumstances to so position the parts as to bring the oil inlet 20 to the lowermost position in order that the oil would flow thereinto by gravity so long as any appreciable quantity of oil was maintained in the reservoir.

We claim:

1. In a bearing, the combination of a shaft and a casing having relative rotation with respect to one another, the casing being formed to provide a reservoir for lubricant, and gears constituting a gear pump in communication with the reservoir and with the bearing surfaces and adapted to effect a circulation of oil, the casing on its exterior surface being configured to constitute a pulley, substantially as described.

2. In a bearing, the combination of a shaft and a casing having relative rotation with respect to one another, the casing being formed to provide a reservoir for a lubricant, a pinion carried by the shaft, a pinion carried by the casing and meshing with the first named pinion, the two pinions coacting to afford a gear pump for the distribution of oil and being in communication with the oil reservoir and bearing surfaces respectively, to effect a circulation of oil, the casing on its exterior surface being configured to constitute a pulley, substantially as described.

3. In a bearing, the combination of a shaft and a casing having relative rotation with respect to one another, the casing being cored to afford an annular oil reservoir, a tubular sleeve carried by the casing and surrounding the shaft and affording an inner wall for the reservoir, the casing being provided in one end with a recess, a pinion on the end of the shaft and within the recess, a pinion carried by the casing and meshing with the first named pinion, the two pinions and the surrounding walls constituting a gear pump, the structure being provided with a supply port leading from the reservoir to the outermost pinion, and a return port leading from the pinions to the bearing surfaces for effecting circulation of oil, substantially as described.

4. In a bearing, the combination of a shaft and a casing having relative rotation with respect to one another, the casing being cored to afford an annular oil reservoir, a tubular sleeve carried by the casing and surrounding the shaft and affording an inner wall for the reservoir, the casing being provided in one end with a recess, a pinion on the end of the shaft and within the recess, a pinion carried by the casing and meshing with the first named pinion, the two pinions and the surrounding walls constituting a gear pump, the structure being provided with a supply port leading from the reservoir to the outermost pinion, and a return port leading from the pinions to the bearing surfaces for effecting circulation of oil, and a spirally extending groove being provided between the sleeve and the shaft for assisting in the distribution of the oil, substantially as described.

5. In a bearing, the combination of a shaft and a casing having relative rotation with respect to one another, the casing being cored to afford an annular oil reservoir, a tubular sleeve carried by the casing and surrounding the shaft and affording an inner wall for the reservoir, the casing being provided in one end with a recess, a pinion on the end of the shaft and within the recess, a pinion carried by the casing and meshing with the first named pinion, the two pinions and the surrounding walls constituting a gear pump, the structure being provided with a supply port leading from the reservoir to the outermost pinion, and a return port leading from the pinions to the bearing surfaces for effecting circulation of oil, and a member secured to the casing and abutting against the pinions and closing the recessed portion of the casing, substantially as described.

6. In a bearing, the combination of a shaft and a casing having relative rotation with respect to one another, the casing being cored to afford an annular oil reservoir, a tubular sleeve carried by the casing and surrounding the shaft and affording an inner wall for the reservoir, the casing being provided in one end with a recess, a pinion on the end of the shaft and within the recess, a pinion carried by the casing and meshing with the first named pinion, the two pinions and the surrounding walls constituting a gear pump, the structure being provided with a supply port leading from the reservoir to the outermost pinion, and a return port leading from the pinion to the bearing surfaces for effecting circulation of oil, a spirally extending groove being provided between the sleeve and the shaft for assisting in the distribution of the oil, and a member secured to the casing and abutting against the pinions and closing the recessed portion of the casing, substantially as described.

7. In a bearing, the combination of a stub shaft, a casing carried by the stub shaft and in the form of a pulley hub adapted to receive a driving belt, the casing being cored to provide an oil reservoir, a sleeve carried by the casing and rotatable upon the stub shaft, the casing being provided in its end with a recess, a fixed inner pinion on the stub shaft mounted within the recess, an outer pinion carried by the casing and meshing with the inner pinion, a fan secured to the casing and closing the recessed portion thereof, the pinions and the surrounding wall surfaces constituting the elements of a gear pump, and the casing being provided with an inlet port for admitting lubricant from the reservoir to the oil pump, and a port for discharging lubricant from the oil pump to the space intermediate the sleeve and stub shaft, substantially as described.

8. In a bearing, the combination of a stub shaft, a casing carried by the stub shaft and in the form of a pulley hub adapted to receive a driving belt, the casing being cored to provide an oil reservoir, a sleeve carried by the casing and rotatable upon the stub shaft, the casing being provided in its end with a recess, a fixed inner pinion on the stub shaft mounted within the recess, an outer pinion carried by the casing and meshing with the inner pinion, a fan secured to the casing and closing the recessed portion thereof, the pinions and the surrounding wall surfaces constituting the elements of a gear pump, and the casing being provided with an inlet port for admitting lubricant from the reservoir to the oil pump, and a port for discharging lubricant from the oil pump to the space intermediate the sleeve and stub shaft, the shaft being provided with a groove to assist in the distribution of the oil, substantially as described.

9. In a bearing, the combination of a shaft and a casing having relative rotation with respect to one another, gears in the casing constituting a gear pump in connection with the casing, the casing being provided on its interior with a tapered reservoir having its greatest enlargement at a point adjacent to the gear pump, and being provided at said point with a port leading from the periphery of the chamber at the point of its greatest enlargement for admitting oil into the gear pump, and being provided with a second port leading from the gear pump to the bearing surface, substantially as described.

10. In a bearing, the combination of a stub shaft and a casing rotatably mounted thereon and in the form of a pulley hub adapted to receive a driving belt, the casing being cored to provide an oil reservoir and having a recess formed in its end, a thrust disk secured to the end of the stub shaft, and provided with gear teeth on its periphery, an outer pinion carried by the casing and meshing with the gear teeth of the thrust disk, a fan secured to the casing and closing the recessed portion thereof, and bearing against the thrust disk, the intermeshing members and surrounding wall surfaces constituting the elements of a gear pump, and a casing being provided with an inlet port for admitting lubricant from the reservoir to the pump, and a port for discharging lubricant from the pump to the space intermediate the sleeve and stub shaft, substantially as described.

TRUMAN B. FUNK.
CLARENCE M. EASON.